T. H. FIELD.
STOCK CENTERER AND CHUCK.
APPLICATION FILED MAR. 26, 1918.
1,308,176.
Patented July 1, 1919.
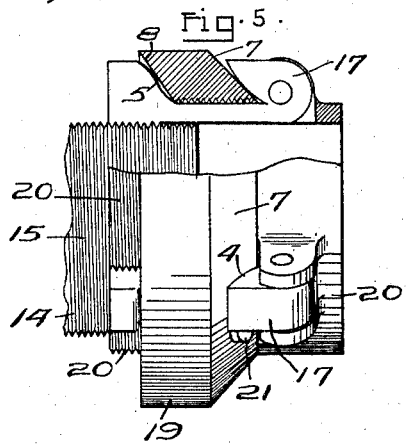
Fig. 5.
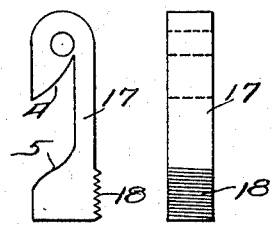
Fig. 6.  Fig. 7.
Fig. 1.
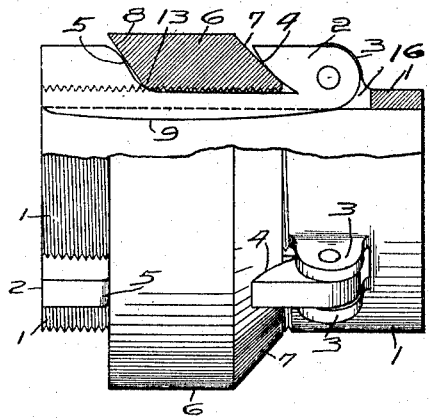
Fig. 2.
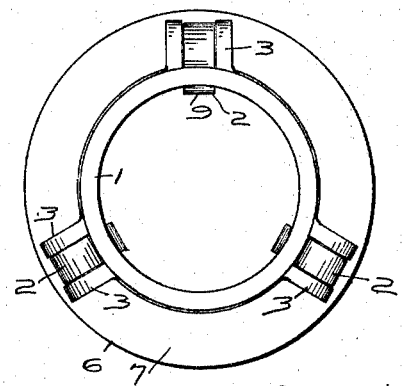
Fig. 3.  Fig. 4.
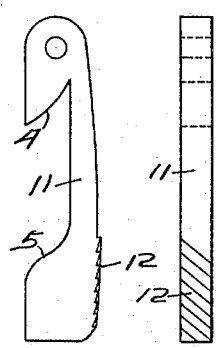
INVENTOR·
Thomas H. Field
by
Owen, Owen & Crampton

UNITED STATES PATENT OFFICE.

THOMAS H. FIELD, OF ARCHBOLD, OHIO.

STOCK CENTERER AND CHUCK.

1,308,176.   Specification of Letters Patent.   Patented July 1, 1919.

Application filed March 26, 1918. Serial No. 224,729.

*To all whom it may concern:*

Be it known that I, THOMAS H. FIELD, a citizen of the United States, and a resident of Archbold, in the county of Fulton and State of Ohio, have invented a certain new and useful Stock Centerer and Chuck; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a means for holding cylindrical articles, while they are being operated upon by a machine or device. It particularly has for its object to provide a centerer or chuck for pipe threading machines, whereby the pipe may be held centrally with respect to the thread cutting dies, or while a thread is being cut or whereby it may be gripped and held while a threaded feed member moves the dies along the end of the pipe. Also it may be used to connect a pipe threading machine or other device with a feed screw. If desired, the form having means for gripping the pipe may be used in conjunction with the means for connecting such a machine with a feed screw which is connected or secured to the work by the gripping device.

The invention may be contained in structures of different forms useful for different purposes. I have selected one form of construction containing the invention and shall describe it hereinafter. The construction selected is illustrated in the accompanying drawing.

Figure 1 of the drawing illustrates a side broken view, partly in section, of the device selected. Fig. 2 illustrates an end view of the device. Figs. 3 and 4 illustrate, respectively, the side and edge views of a dog having slightly different construction from that shown in Fig. 1. Fig. 5 illustrates an application of the invention to a screw feeding or threaded means. Figs. 6 and 7 illustrate, respectively, side and edge views of the dogs illustrated in Fig. 6.

1, Fig. 1, is a cylindrical shell that may be attached to or form a part of a machine or device used to operate upon cylindrical bodies that are centered or secured by the chuck. The bodies are located within the shell and are centered or secured by the dogs 2. The dogs 2 are pivoted in ears 3 formed on the shell. Any number of dogs may be used. In the form of construction shown, three dogs are located 120° apart around the shell and in slots 16. The dogs are provided with cam surfaces 4 and 5. The cam surfaces 4 and 5 form the ends of a cross cut through the dogs 2. They are so formed as to permit movement of the ring 6 having the inclined or cam surfaces 7 and 8, to move along the shell 1. The shell is threaded exteriorly and the ring 6 is threaded onto the shell 1. When the surface 7 of the ring 6 engages the cam surface 4 of each dog, it lifts the dog 2 out of the shell 1 and as the ring 6 is moved farther along the shell 1 when it is rotated on the shell 1, portions of the cam surface 5 will slide along the inclined or cam surface 8. The surfaces 4 and 7 and the surfaces 5 and 8 are so formed as to allow rotative movements of the ring 6 and yet so there will be contact at all times between the pairs of surfaces. Moreover, the surfaces are so formed that when the surface 7 presses against the surface 4, it will swing the free end of the dog away from the center of the shell 1, and when the shell 6 is rotated in the opposite direction so as to move it away from the pivot pin of the dog, it will press against the surface 5 so as to force the dog into the shell 1 to clamp with greater or less pressure any article that may be located within the shell. The cam surface 5 being so constructed that when the dog moves a short distance into the shell, the inclined relation of the contact portions of the surfaces 5 and 8 with reference to the direction of movement of the dog and the ring will permit the dog to be tightly clamped by the rotative movement of the ring 6.

In the particular construction shown, the surface 5 is of sinuous form, that is, it has a double curvature in opposite directions, while the surface 4 is of single curvature and is convex in form. The lower corner 13 of the surface 8 may be curved in order that it may readily move over a part of the cam surface 5. This is particularly of advantage when the dogs are nearly removed from within the shell 1. Inasmuch as the dogs move the same distances upon given movement of the ring 6 they will occupy equal distances from surface of the shell 1 and consequently will hold a cylindrical body centrally with respect to the shell 1. The surface 9 of the dogs is also preferably a curved surface, so as to give as far as possible an increased area of contact between each dog and the object.

If desired, the ring 6 may be corrugated in order that it may be tightly gripped in forcing the dogs against the object to be held, but so as to permit rotation of the shell 1 and if desired, movement of the dogs over the surface of the object that is thus held. The dogs 11, shown in Figs. 3 and 4 may be provided not only with the cam surfaces 4 and 5 but also with the teeth 12, that may be cut diagonally across the dogs in order to prevent rotative movements of the shell 1 under conditions wherein such rotative movements may occur and to prevent longitudinal movement of the object and the shell relative to each other. The diagonal teeth 12 operate to resist both longitudinal and rotative movements of the object and the shell relative to each other.

The invention may also be applied to a device which is to be moved forward with reference to relative rotative movements of a threaded member. In such a case, the dogs may be provided with threaded portions that fit the threaded member to which the shell is to be connected and with respect to which the shell is to be moved in definite relation, that is, moved with respect to the pitch of the thread of the threaded member. In the form of the structure shown in Fig. 6, the dogs 17 are provided with the threaded portions 18 having the same thread as that found on the threaded member, such as a feed screw 14. The ring 19 may be turned so as to cause the dog 17 to move toward the axis of the shell 20 and the threaded member 14, and until the thread 18 of the dogs engage, without fitting too tightly, the thread 15 of the threaded member 14. The dogs 17 will thus engage the thread 15 at three points around the threaded member 14 and will hold the shell 20 in axial alinement with the feed screw or threaded member 14. In order to prevent the ring from closing the dogs 17 too tightly on the thread 15, a stop 21 may be located on the ring 19, which will strike one of the dogs 17 when the ring 19 is turned to bring the dogs toward the feed screw 14. The fact that the cam surfaces 4 and 5 of the dogs 17 are held at all times in the positions to which they may be lifted by the ring 19, the cam surfaces 4 and 5 being caused to slide over the surfaces 7 and 8 of the ring 19, the dogs 17 may thus be brought down upon the thread 15 and held not too tightly to cause the thread to cut, any loose play, however, being prevented by reason of the fact that the surfaces 7 and 8 fit in between the surfaces 4 and 5 at all times. Preferably, the dogs 17 are made thicker than the dogs 9 and 11 to increase the area of the threaded portions 18. Also the ring 19 and the dog 17 may be made shorter owing to the fact that very little radial movement in the dog 17 is required, while the dogs 9 and 11 may be caused to have considerable radial movement in order that the tool may be connected with different sized pipes or stock.

The dogs 17 may be readily removed from the thread 15 by rotation of the ring 19, whereupon a machine connected to the shell 20 may be readily removed from the work to which the feed screw 14 is connected. Also the tool connected to the shell 20 may be relatively positioned with reference to the work and the feed screw 14, since the connection may be made at any point with the thread 15 by mere rotation of the ring 19.

I claim:—

1. In a stock centering means, a threaded shell having slots formed therein, a plurality of centering members pivoted at their ends to the shell and located in the slots, the centering members having cam surfaces extending diagonally with respect to the length of the centering members and located intermediate the free ends of the centering members and their pivots, a ring threaded on to the shell and having cam surfaces fitting between the cam surfaces of the centering members.

2. In a stock centering means, a threaded shell having slots therein, a plurality of centering members pivoted at their ends to the shell and located in the slots, a ring threaded onto the shell and having cam surfaces located at its ends, the centering members having cam surfaces located intermediate the free ends and the pivots of the centering members, one of the cam surfaces of each of the centering members located in a part extending over the ring and one of the cam surfaces of the ring the other cam surface of the ring extending over the other cam surface of the centering members.

3. In a centering means, a threaded shell having slots formed therein, a plurality of centering members pivoted to the shell and located in the slots, the centering members having recesses formed in the outer edges thereof, a ring threaded onto the shell and located in the recesses, the ends of each recess forming cam surfaces, the ring having conical surfaces coacting with and fitting between the cam surfaces of the centering members at all positions of the centering members while the ring is operating to move the free ends of the centering members to and from the center of the shell.

4. In a centering means, a threaded shell having slots formed therein, a plurality of centering members pivoted to the shell and located in the slots, the centering members having recesses formed in the outer edges thereof, a ring threaded onto the shell and located in the recesses, the ends of each recess forming cam surfaces, the ring having conical surfaces coacting with and fitting between the cam surfaces of the centering members at all positions of the centering members while the ring is operating to move the free ends of the centering members to and from the center of the shell, a screw member, the centering members having thread portions fitting the threads of the screw members.

In testimony whereof I have hereunto signed my name to this specification.

THOMAS H. FIELD.

Copies of this patent may be obtained for five cents each, by addressing the "Commissioner of Patents, Washington, D. C."